(12) United States Patent
Scagliarini

(10) Patent No.: US 7,572,309 B2
(45) Date of Patent: Aug. 11, 2009

(54) FILTER FOR VENTING ENCLOSURES, FOR EXAMPLE CONTAINING ELECTRICAL EQUIPMENT, SUCH AS VEHICLE LIGHTING UNITS, AND EXPOSED TO MOISTURE OR ATMOSPHERIC AGENTS

(75) Inventor: Marco Scagliarini, Bologna (IT)

(73) Assignee: GVS S.p.A., Zola Predosa (Bologna) (IT)

( * ) Notice: Subject to any disclaimer, the term of this patent is extended or adjusted under 35 U.S.C. 154(b) by 336 days.

(21) Appl. No.: 11/418,180

(22) Filed: May 5, 2006

(65) Prior Publication Data

US 2006/0254227 A1    Nov. 16, 2006

Related U.S. Application Data

(60) Provisional application No. 60/678,184, filed on May 6, 2005.

(51) Int. Cl.
    *B01D 46/00* (2006.01)
(52) U.S. Cl. .................. 55/385.4; 55/385.1; 55/320; 55/505; 55/510; 55/385.3; 95/273; 96/4; 362/547
(58) Field of Classification Search ............... 55/385.1, 55/385.4, 320, 505, 510, 385.3; 95/273; 96/4; 362/547
    See application file for complete search history.

(56) References Cited

U.S. PATENT DOCUMENTS

| 4,900,441 | A | 2/1990 | Graus et al. |
| 5,406,467 | A | 4/1995 | Hashemi |
| 6,071,000 | A | 6/2000 | Rapp |
| 6,174,231 | B1 | 1/2001 | Bodin |
| 6,969,415 | B2 * | 11/2005 | Traut et al. ................. 55/385.4 |
| 2004/0025693 | A1 * | 2/2004 | Bedingfield et al. ........... 95/273 |
| 2007/0245894 | A1 * | 10/2007 | Poulis ............................. 96/4 |

FOREIGN PATENT DOCUMENTS

| DE | 197 02 685 A1 | 7/1998 |
| EP | 0 717 231 A1 | 6/1996 |
| EP | 0 860 923 A1 | 8/1998 |
| EP | 1 184 602 A1 | 3/2002 |
| JP | 07-147106 | 6/1995 |

\* cited by examiner

*Primary Examiner*—Duane Smith
*Assistant Examiner*—Minh-Chau T Pham
(74) *Attorney, Agent, or Firm*—Young & Thompson

(57) ABSTRACT

A filter for venting an enclosure (1) containing an electrical apparatus (4), such as a lens or lighting unit of a motor vehicle, and exposed to moisture or atmospheric agents, the filter including a tubular body (20) with a through cavity or conduit (11) opening at opposite ends (9, 10) of the body (20), which is coupled to a venting aperture (6) of the enclosure (1), the filter (8) including a hydrophobic filtering element; the body (20) of this filter (8) includes at least two portions (20A, 20B) set at an angle to each other, the membrane filtering element (15) being in the interior of the body (20) and being associated with it in such as manner as to form one piece therewith, and being coupled to the body (20) in a manner transverse to an axis of at least one of the portions.

6 Claims, 1 Drawing Sheet

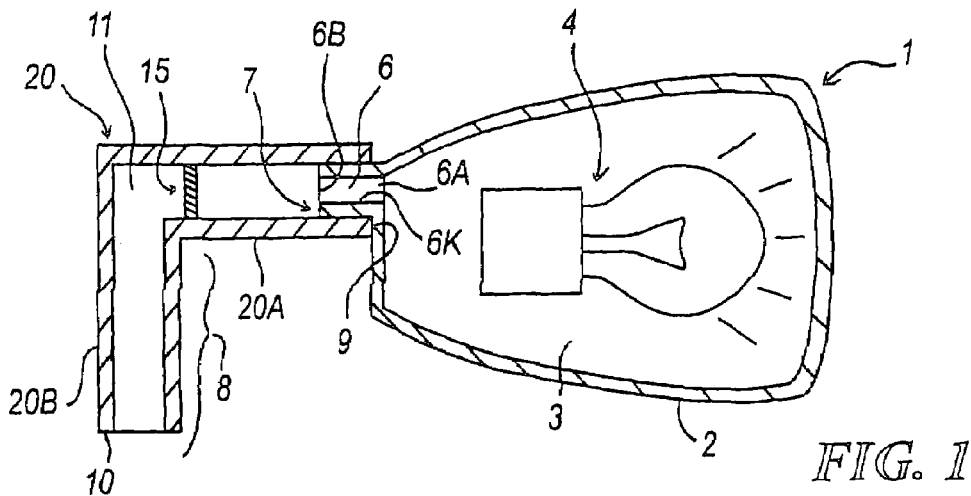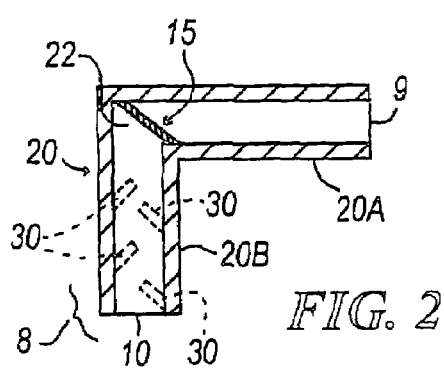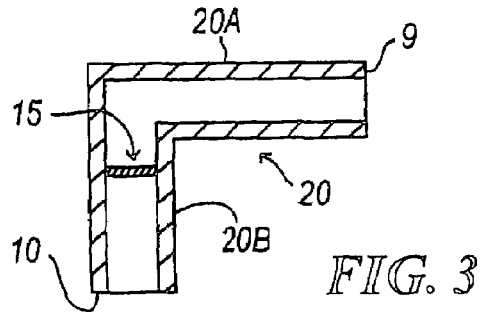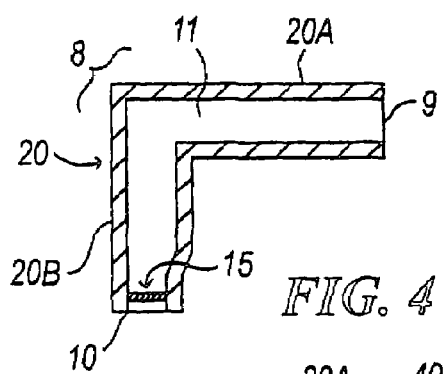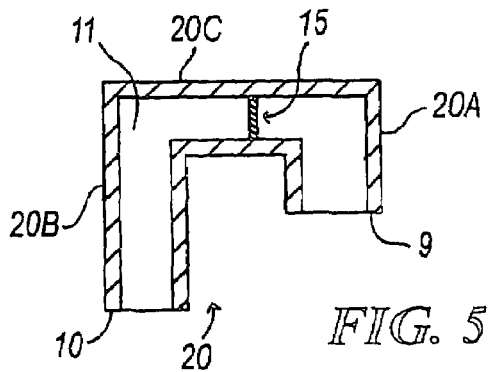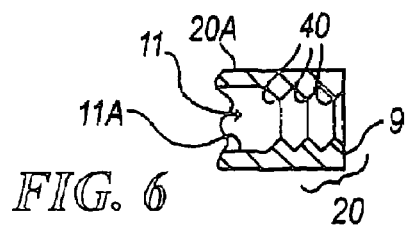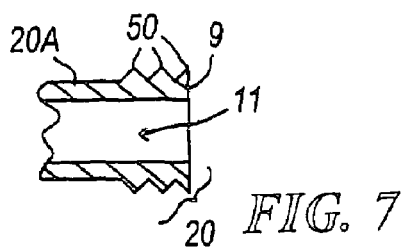

FILTER FOR VENTING ENCLOSURES, FOR EXAMPLE CONTAINING ELECTRICAL EQUIPMENT, SUCH AS VEHICLE LIGHTING UNITS, AND EXPOSED TO MOISTURE OR ATMOSPHERIC AGENTS

This application is corresponding to U.S. Provisional Application No. 60/678,184 filed on May 6, 2005, the entirety of which application is hereby expressly incorporated by reference in the accompanying application.

DESCRIPTION OF THE RELATED ART

The present invention relates to a filter for venting an enclosure containing an electrical, mechanical, electromechanical or similar apparatus in accordance with the introduction to the main claim.

It is known to use filters of the aforesaid type for venting in the automobile industry (or in vehicles in general, this term meaning an automobile, a truck, a motorcycle or the like); these filters are associated for example with venting apertures of containers containing electrical or electronic parts (such as the lens or lighting or headlight units of motor vehicles) or mechanical parts (gear boxes, for example) where pressure has to be equalized between the interior of these containers and the external environment. These filters are also known to present a conformation or elements at least such as to limit water entry into said containers, said water being able to derive from rain or puddles or being able to derive from the washing of the vehicle or its engine. For example, a filter is known presenting a hollow tubular (elbow) bent conformation and shaped internally as a labyrinth to prevent or at least limit water access from the outside to the inside of the container via the tubular (venting) cavity of the filter.

Filters of the said type are also known using membranes of hydrophobic material associated with an internal conduit of the filter communicating with the container interior. Examples of these filters are those described in U.S. Pat. No. 5,914,415 and U.S. Pat. No. 5,522,769. In such filters of the state of the art and in particular in those described in the aforesaid US patents, the membrane is an element separate from the filter body and must be associated therewith by usually complex operations which require time and considerable care to prevent the membrane from breaking during handling. These operations are therefore costly.

For example, in U.S. Pat. No. 5,522,760 the hydrophobic membrane (preferably of polytetrafluoro ethylene) is inserted into a channel or seat lying transverse to a venting or passage conduit of the filter. The seat has a suitable diameter to securely contain the membrane. This known solution, in which the filter body has a substantially cap conformation and the venting conduit is rectilinear, is difficult to construct precisely because of the operations for coupling the membrane to the interior of the known filter body.

This latter also presents a rectilinear venting conduit which does not provide optimal protection to the container to which the filter is connected when this latter is subjected to a direct flow of liquid, such as that to which that part of a front headlight of a vehicle facing the engine may be subjected when this latter is exposed to washing with relatively high water pressure. This lack of protection against water infiltration can also appear in the case of tightness tests to which motor vehicle headlights or lens units or lighting systems are subjected, tests during which a high pressure water flow Is strikes the headlight container to verify its tightness. Again in this case, the conformation of the filter venting conduit is not such as to adequately protect the filtering membrane from the pressurized liquid should this latter cause breakage of the diaphragm provided in U.S. Pat. No. 5,522,769 for protecting the hydrophobic membrane. In this respect, the diaphragm can protect the membrane if the filter is immersed in a liquid or if the liquid is able to directly strike the membrane, as stated in the prior patent. However in this latter, the liquid which could strike the membrane is not stated to be a liquid under pressure, as is clear from the example offered in the text of the prior patent, in which this liquid is stated to be oil which is accidentally poured onto the filter.

U.S. Pat. No. 5,914,415 also describes a filter provided with a hydrophobic membrane or water repellent film associated, for example by subsequent fusion, with the filter body which is formed of elastomeric material. The film is finally protected by a cover cap fixed by pins (rigid with the cap) inserted into seats in the elastomeric body. The filter described in the prior patent is constructed as a plurality of parts assembled together, resulting in high costs and production times, together with constructional difficulties related to the operations of coupling the water repellent membrane or film to the elastomeric body and of coupling the cap to this latter body.

SUMMARY OF THE INVENTION

An object of the present invention is to provide a filter for venting an enclosure, for example containing electrical apparatus such as an enclosure used in the automobile field as a lens unit (or lighting system in general) or container for electrical circuitry for controlling a vehicle engine, which is improved compared with already known similar filters.

A particular object of the invention is to provide a filter of the stated type which can be produced relatively quickly at low cost.

Another object is to provide a filter of the stated type which offers a mechanical strength and a liquid seal which are optimal under all conditions of utilization of the container with which the filter is associated and in all other situations in which this container is struck by a liquid under pressure.

These and further objects which will be apparent to the expert of the art are attained by a filter in accordance with the accompanying claims.

BRIEF DESCRIPTION OF THE DRAWINGS

The present invention will be more apparent from the accompanying drawings, which are provided by way of non-limiting example and in which:

FIG. 1 is a schematic cross-section through a first embodiment of a filter of the invention applied to an enclosure defined by a vehicle lens unit, also shown schematically; and FIGS. from 2 to 7 are cross-sections through further embodiments of the invention.

DETAILED DESCRIPTION OF THE PREFERRED EMBODIMENTS

With reference to said figures, an enclosure to be vented is indicated overall by 1. In the example it is schematically shown as a lens unit or headlight or lighting system of a motor vehicle, but can be any container of an electrical or mechanical apparatus of a vehicle. The enclosure 1 comprises a body 2, internally hollow at 3, where an electrical apparatus 4 (a light bulb in the example) is located. The cavity 3 communicates with the outside of the body 2 via a conduit 6 provided in an appendix 7 projecting from this body, said conduit 6 being open at both its ends 6A (communicating with the cavity 3) and 6B (communicating with the outside of the enclosure).

In correspondence with the end 6B of the appendix 7 there is connected a filter 8 formed in accordance with the invention. It is such as to enable said cavity 3 to be vented, but to prevent water entry and to reduce the entry of moisture into it.

More particularly, the filter 8 presents a body 20 having at least two internally hollow tubular portions 20A, 20B. These are disposed at an angle to each other; a first portion 20A is connected, via its free end 9, directly to the appendix 7 of the body 2 of the enclosure 1, whereas the second portion 20B presents a free end 10 at which there opens an internal conduit 11 of the filter 8. This internal conduit 11 communicates with that 6 of the appendix 7, enabling air to pass from the outside to the inside of said body 2 and vice versa. In this manner the internal cavity of the enclosure 1 can be correctly aerated. The angled arrangement of the at least two portions 20A, 20B of the filter 8 also prevents any water droplets present outside the filter from being able to easily pass to the interior of the enclosure 1. Said conformation also prevents any water jets used to wash the automobile or its engine from penetrating into the enclosure 1 when the lens or lighting unit is sufficiently protected by the bodywork of such a vehicle (automobile, motorcycle, heavy vehicle or truck, or the like).

To ensure that this water passage does not take place, a filtering element of hydrophobic membrane type 15 (of known type) is positioned in the internal conduit 11 of the filter 8, in any position between its ends 9, 10, transversely to the conduit 11, to prevent passage of water from the end 10 to the end 9 (and from there into the enclosure 1). According to an important characteristic of the invention, the filtering element or, more simply, the membrane 15 forms one piece with the body 20 of the filter 8. Preferably, the membrane is incorporated, in correspondence with its edge, into said body (constructed of plastic material). The membrane 15 hence forms one piece with said body 20, so as to be stably associated with it.

To obtain said integration between the body 20 and the membrane 15, the filter 8 is preferably constructed in accordance with the teachings of EP1184602. According to this latter, the filter 8 is obtained by moulding with a mould shaped to enable the free edge of the membrane 15 to be incorporated into the plastic material in the molten state which is injected into the mould, said material wrapping said edge of the membrane and incorporating it into itself when the material cools. The mould obviously has a shape such as to enable the body 20 to be obtained with at least two portions at an angle to each other.

As stated, the membrane 15 can be disposed in any position in the interior of the conduit 11 within its rectilinear portion or in correspondence with a discontinuity thereof. Different examples of this positioning are shown in particular in FIGS. from 2 to 4; specifically, in FIG. 2 the membrane 15 is positioned in correspondence with the angled region 22 of the conduit 11, the region in which the two portions 20A and 20B of the filter body 20 join together. This solution enables a hydrophobic membrane or filtering element 15 to be obtained having effective dimensions greater than the transverse dimensions of the conduit 11, so enabling a greater surface for gas transfer between the inside and outside of the enclosure 1 to be obtained.

In FIG. 3 the membrane 15 is positioned in correspondence with the portion 20B of the body 20 of the filter 8, in contrast to that of the filter of FIG. 1 where the membrane 15 is positioned in correspondence with the portion 20A of that body.

In FIG. 4, however, the membrane 15 is close to one of the ends (in the example the end 10) of the body 20 of the filter 8, while again remaining inside the conduit 11.

With regard to the portions 20A, 20B of the body 20 of the filter 8, these can present a corresponding conduit 11 with constant cross-section (FIGS. 1 and 3) or variable cross-section (FIG. 4). In this latter case, varying the cross-section of the conduit also varies the flow rate of fluid or gas from one end of the conduit 11 of the filter 8 to the other.

Moreover, advantageously, one or more of the portions 20A, 20B can present a labyrinth conformation within the corresponding part of the conduit 11 so as to improve the liquid seal of the filter. In that case, the labyrinth is defined by a series of fins 30 (shown dashed in FIG. 2) projecting towards the centre of the conduit and disposed between the end 10 and the membrane 15.

Moreover, to increase the capacity to prevent possible liquid passage from the end 10 to the end 9 of the body 20 of the filter 8, this latter can also have more than two angled portions between the portions 20A and 20B; FIG. 5 shows an embodiment in which the portions are of odd number (for example three), between the portions 20A and 20B there also being present a third portion 20C.

The filter 8 can be coupled to the appendix 7 in any known manner, for example by drawing its first portion 20A over said appendix (as shown in FIG. 1). To achieve a better liquid seal, the free end 9 of said portion 20A can present a plurality of circular projections 40 in the interior of the conduit 11 (i.e. jutting from its wall 11A) arranged to cooperate with the free surface of the appendix 7.

Alternatively, if the portion 20A is coupled to the appendix 7 by being inserted into the conduit 6, the projections 50 can be provided on the outside of the portion 20 to cooperate with the wall 6K of said conduit 6 in order to seal against it.

Embodiments of the invention have been described. Others are however obtainable, such as that in which the body 20 assumes a disjointed conformation and comprises more than one membrane 15, or that in which the membrane 15 is co-moulded with the body 20 of the filter 8. These solutions are also to be considered as falling within the scope of the following claims.

The invention claimed is:

1. A filter for venting an enclosure (1) with a venting conduit (6) and containing an electrical apparatus (4), said filter (8) comprising:
    a tubular body (20) with an internal conduit (11) having openings at opposite ends (9, 10) of said body (20), the internal conduit (11) configured to couple to the venting conduit (6) of said enclosure (1); and
    a filtering element (15) in the form of a hydrophobic membrane positioned within a rectilinear part of the conduit (11),
    wherein said body (20) is comprised of at least two adjacent portions (20A, 20B) set at an angle to each other,
    wherein the filtering element (15) is in an interior of the conduit (11) of said body (20) and associated with said conduit in such as manner as to form one piece therewith,
    wherein the filtering element (15) is disposed transversely within the conduit (11), the filtering element (15) being incorporated into the body (20) of the filter (8) to form an integral combination between said body and said filter,
    wherein the body (20) and the filtering element (15) enable said enclosure to be vented, prevent water entry, and reduce the entry of moisture,
    wherein the filtering element (15) is positioned in correspondence with an angled region (22) of said conduit, said region (22) being present in a connection zone between the two adjacent angled portions (20A, 20B) of the body (20), wherein the filtering element (15) has a surface area greater than the cross-sectional area of the rectilinear portion of the conduit (11), and wherein the filtering element (15) is co-moulded with the body (20) of the filter (8).

2. The filter as claimed in claim 1, further comprising:

a plurality of projections (30) within said conduit (11) and jutting from a wall (11A) of said conduit (11) towards the interior of said conduit, said projections (30) defining a labyrinth in the interior of said conduit and being present between a free end (10) of the body (20) and the filtering element (15), and wherein the projections (30) improve the blocking action against water entering the conduit (11) from the free end (10).

3. The filter as claimed in claim 1, wherein the conduit (11) is of variable cross-section.

4. The filter as claimed in claim 1, wherein the body (20) is configured to couple to an appendix (7) of said enclosure (1), and wherein the venting conduit (6) is provided within the appendix.

5. The filter as claimed in claim 4, wherein one of the two portions (20A) of the body (20) is configured to be drawn over said appendix (7), the appendix (7) configured to be inserted into the conduit (11) of said body (20), and wherein projections (40) extend from a wall (11A) of said conduit (11) to cooperate with said appendix (7) in order to seal against the appendix (7) when coupling is complete.

6. The filter as claimed in claim 4, wherein one of the two portions (20A) of the body (20) is configured to be inserted into the venting conduit (6) of said appendix (7), said appendix (7) being external to said one of the two portions (20A), and wherein provided projections (50) are arranged on an outside of said one of the two portions (20A) to cooperate with a wall (6K) of said conduit (6) in order to seal against said conduit (6) when coupling is complete.

\* \* \* \* \*